Dec. 25, 1951 D. M. SEELEY 2,580,248
TRANSPORTATION LOAD AND METHOD OF PREPARING SAME
Filed April 19, 1949 7 Sheets-Sheet 1
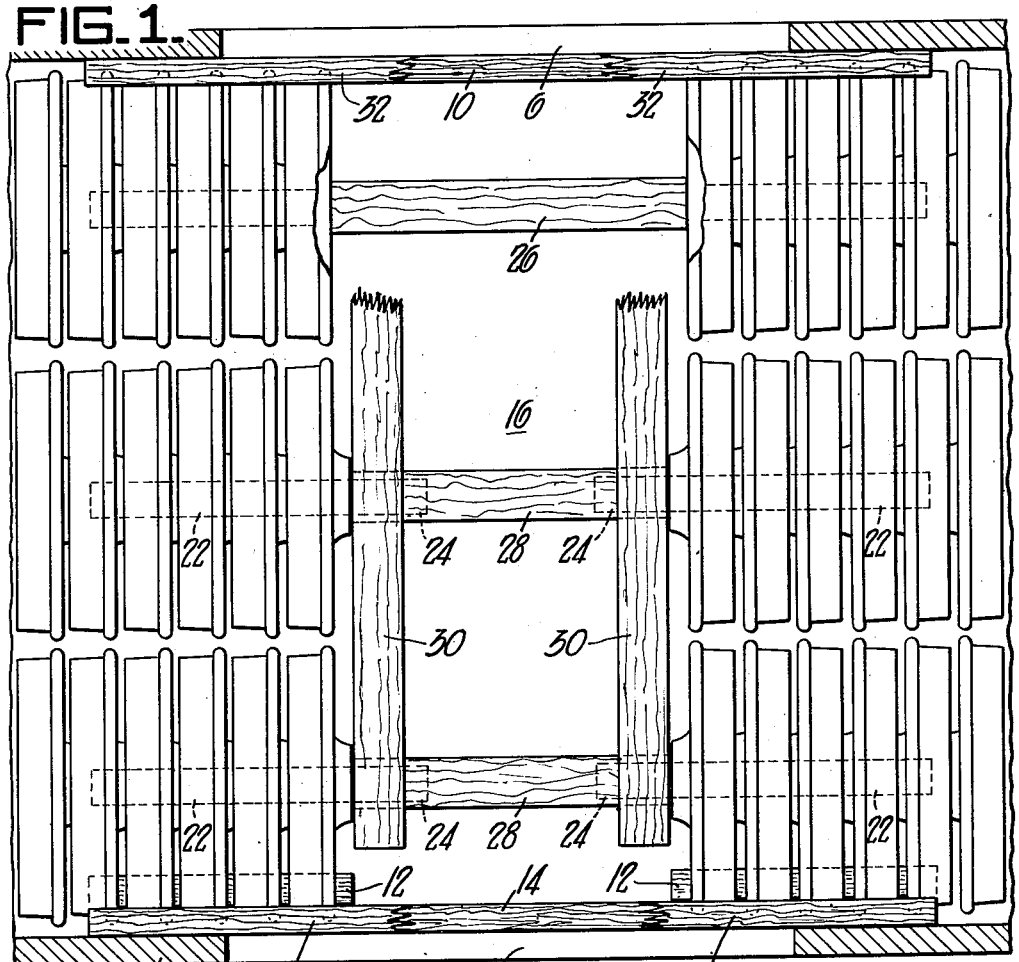
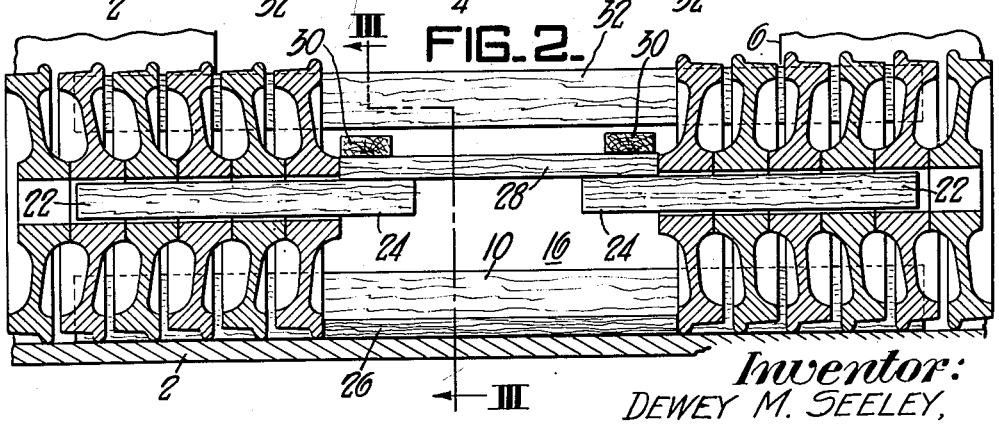
Inventor:
DEWEY M. SEELEY,
by: Donald G. Dalton
his Attorney.

Dec. 25, 1951          D. M. SEELEY          2,580,248
TRANSPORTATION LOAD AND METHOD OF PREPARING SAME
Filed April 19, 1949          7 Sheets-Sheet 2
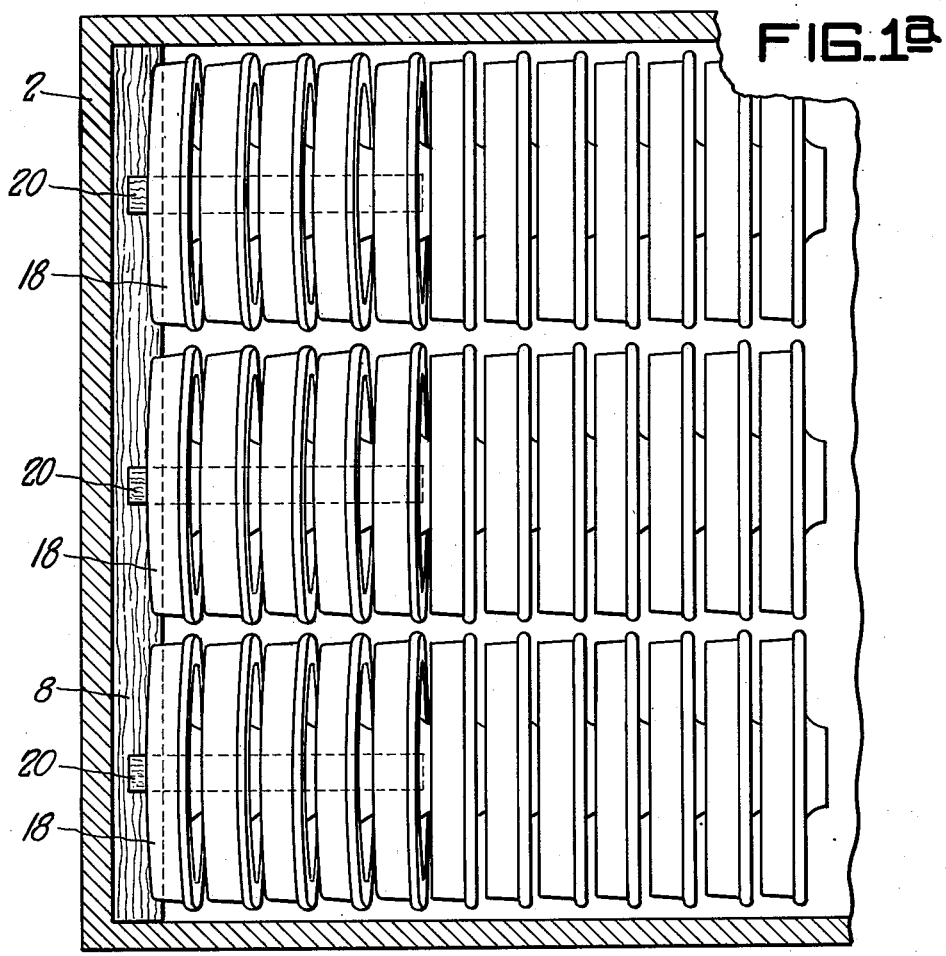
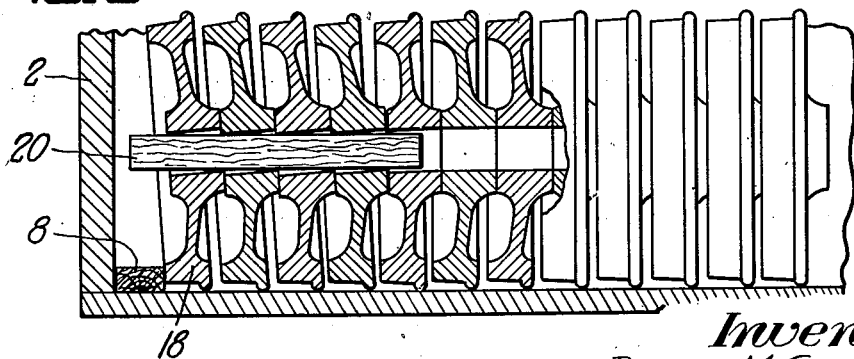
*Inventor:*
DEWEY M. SEELEY,
by: Donald G. Dalton
his Attorney.

Dec. 25, 1951 D. M. SEELEY 2,580,248
TRANSPORTATION LOAD AND METHOD OF PREPARING SAME
Filed April 19, 1949 7 Sheets-Sheet 3
FIG.3.
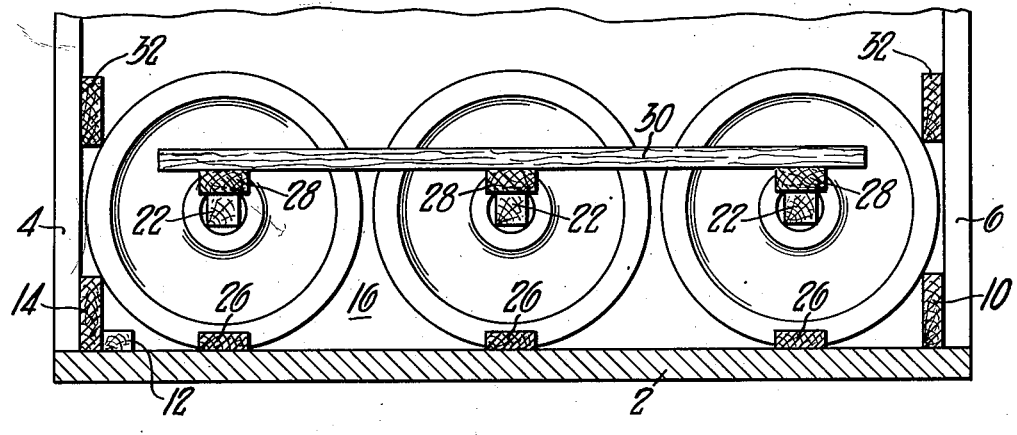
FIG.3ª
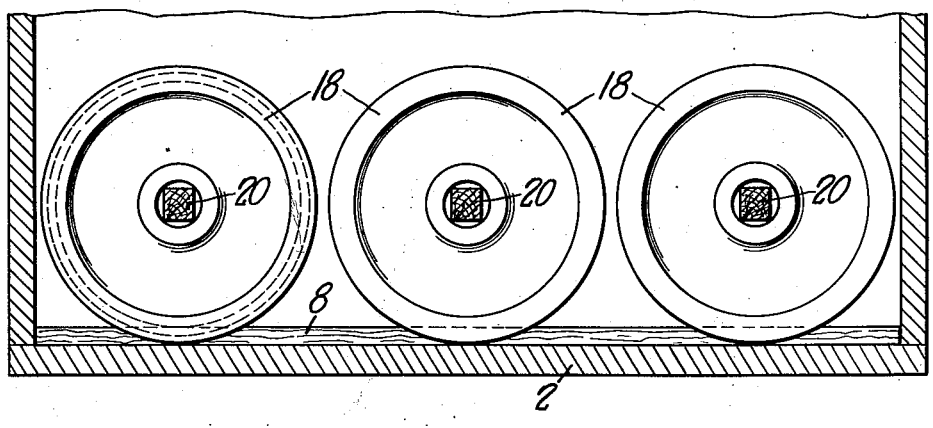
Inventor:
DEWEY M. SEELEY,
by Donald G. Dalton
his Attorney Dec. 25, 1951 D. M. SEELEY 2,580,248
TRANSPORTATION LOAD AND METHOD OF PREPARING SAME
Filed April 19, 1949 7 Sheets-Sheet 4

Inventor:
Dewey M. Seeley,
by: Donald G. Dalton
his Attorney.

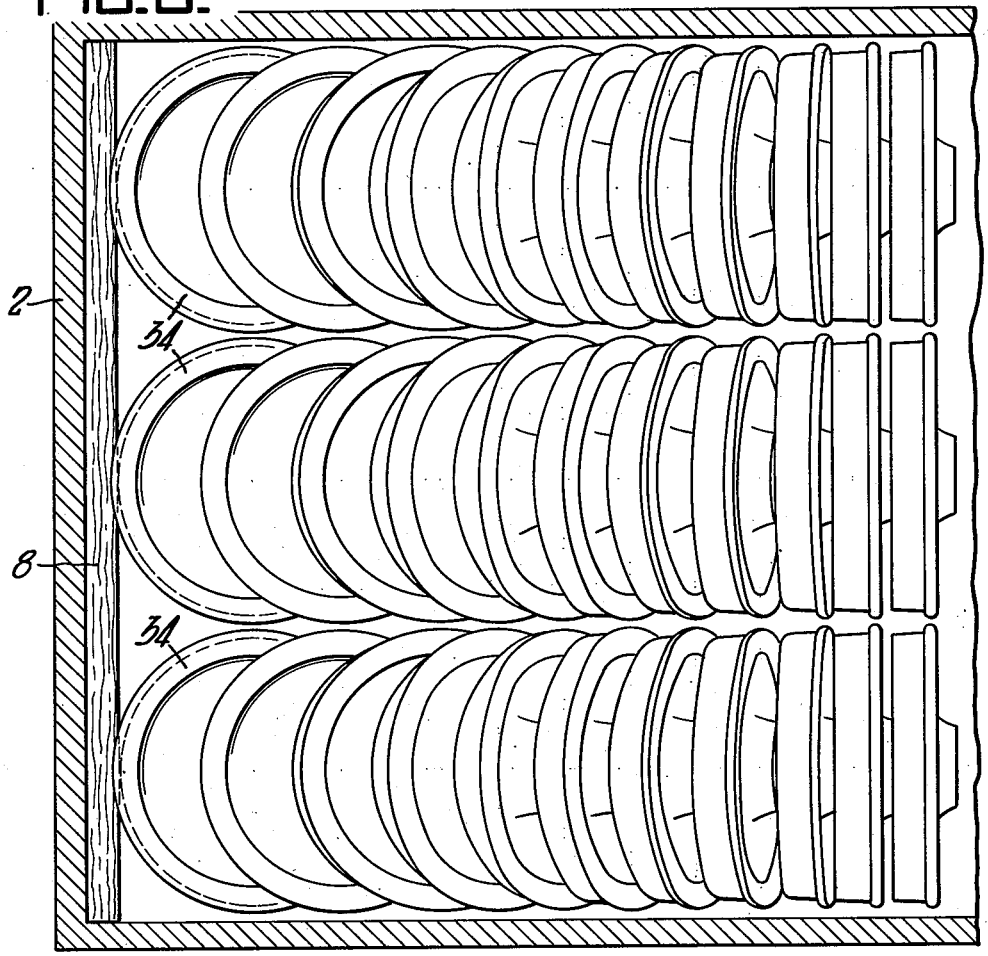
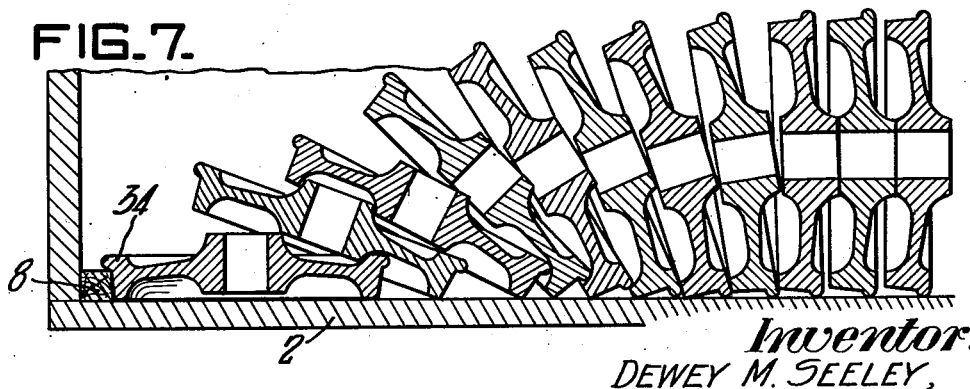

Dec. 25, 1951  D. M. SEELEY  2,580,248
TRANSPORTATION LOAD AND METHOD OF PREPARING SAME
Filed April 19, 1949  7 Sheets-Sheet 7
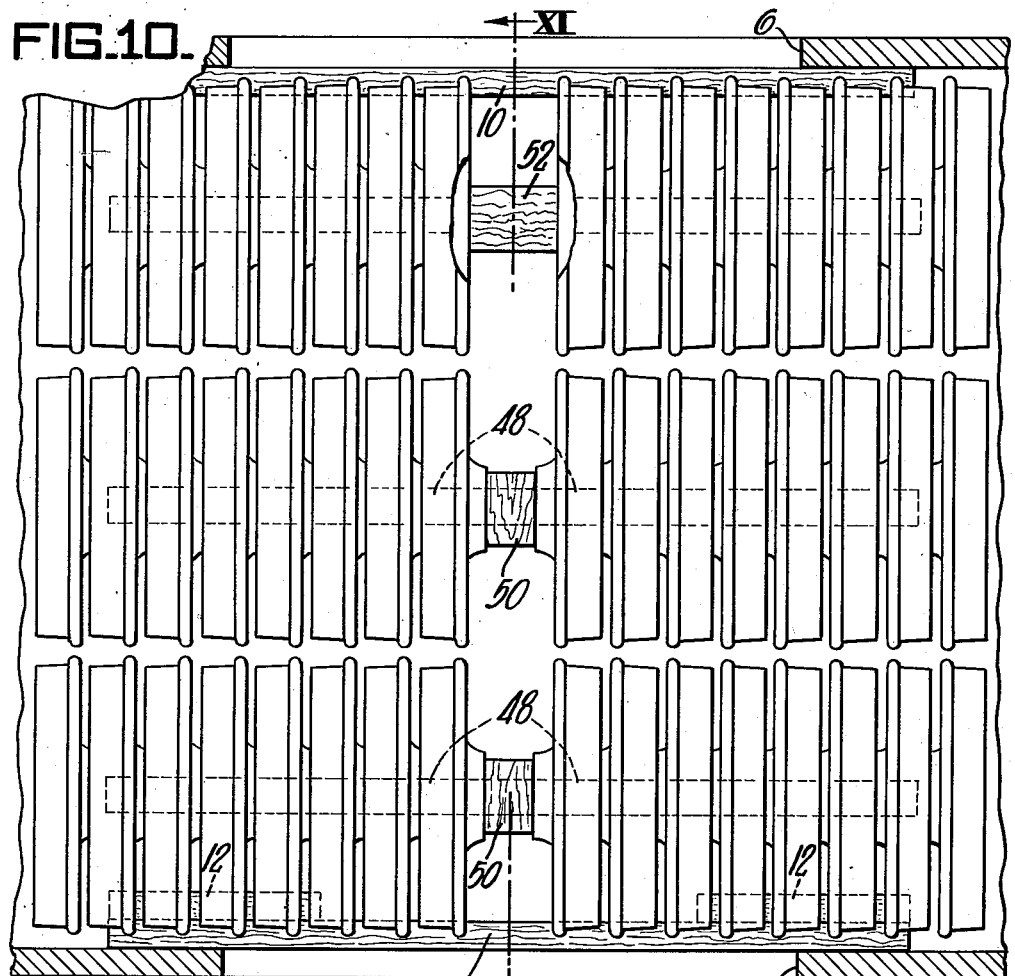
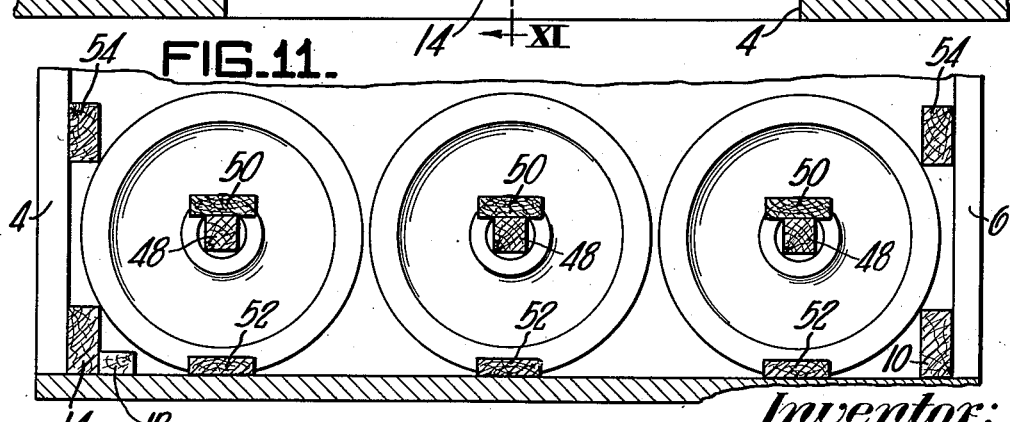
Inventor:
DEWEY M. SEELEY,
by: Donald G. Dalton
his Attorney.

Patented Dec. 25, 1951

2,580,248

UNITED STATES PATENT OFFICE 2,580,248

TRANSPORTATION LOAD AND METHOD OF PREPARING SAME

Dewey M. Seeley, Gary, Ind., assignor to United States Steel Company, a corporation of New Jersey Application April 19, 1949, Serial No. 88,261

26 Claims. (Cl. 105—367)

1

This invention relates to a transportation load and method of preparing the same and is especially adapted for the transportation of railroad car wheels.

The loading, shipping and unloading of railroad car wheels has always been a problem due to the irregular shape, size and weight of the wheels. The wheels, being round with a flange off-center, will not stand upright when unsupported. The protruding hubs of the wheels further complicate the problem of arranging the wheels in a load which can be solidly blocked. The blocking of the wheels in a railroad car has been particularly troublesome since, however stacked according to any of the approved loading methods in use prior to my invention, there was always a certain amount of play in the load which permitted pounding. The impact of continuous pounding eventually tore out any spikes on which the load was concentrated and thereby caused the blocking to be torn loose. When the blocking was torn loose, the wheels were free to roll or slide around and cause considerable damage to both the load of wheels and the car.

The previously used loading methods were also inherently inefficient inasmuch as less than two-thirds of a railway box car's total weight capacity could be utilized when the car was loaded in accordance with any of the load patterns approved and in use prior to my invention.

It is, accordingly, an object of this invention to provide a transportation load of railroad car wheels and a method of preparing the same in a railroad shipping car so that neither the load nor the shipping car is damaged in transit.

Another object of my invention is to provide a transportation load of railroad car wheels and a method of preparing the same which will efficiently utilize the weight capacity of a shipping car.

These and other objects will be more apparent after referring to the following specification and attached drawings, in which:

Figure 1 is a plan view showing the center blocking of my invention;

Figure 1a is a plan view showing a car end wheel piling arrangement;

Figure 2 is a side elevation of Figure 1;

Figure 2a is a side elevation of Figure 1a;

Figure 3 is a cross-sectional view taken on the line III—III of Figure 2;

Figure 3a is a transverse sectional view of Figure 1a looking toward the end wall and with all but the first line of wheels on the left removed;

2

Figure 4:
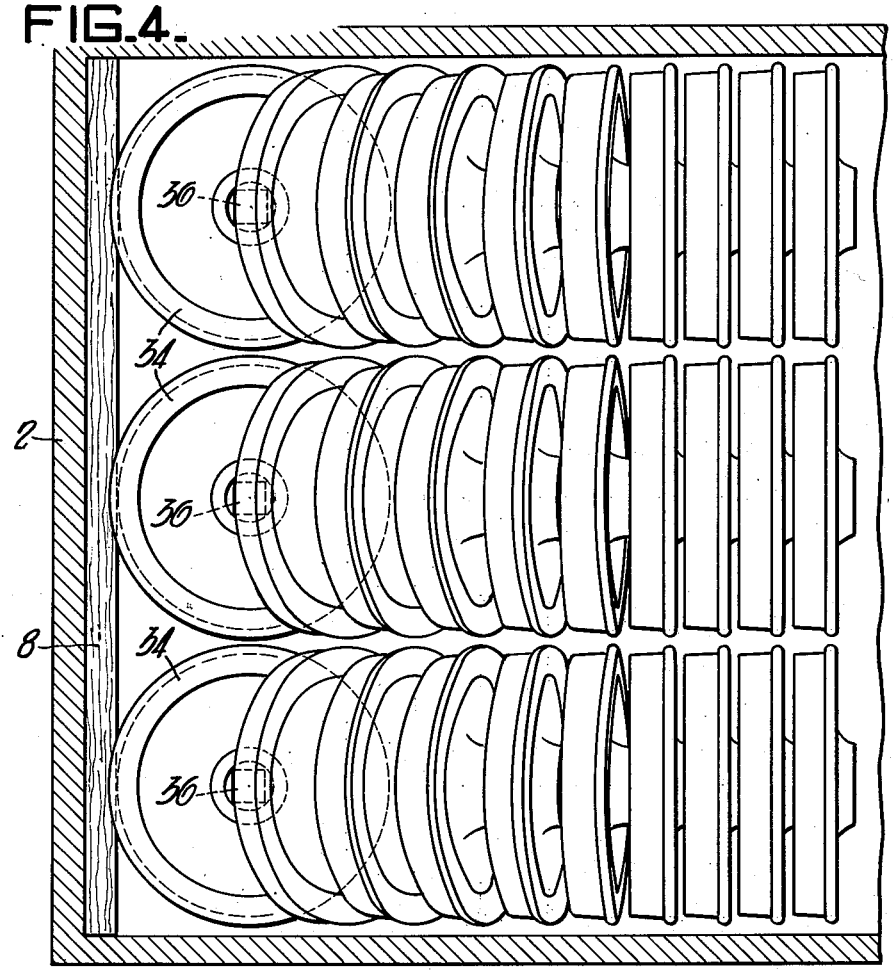
Figure 5:
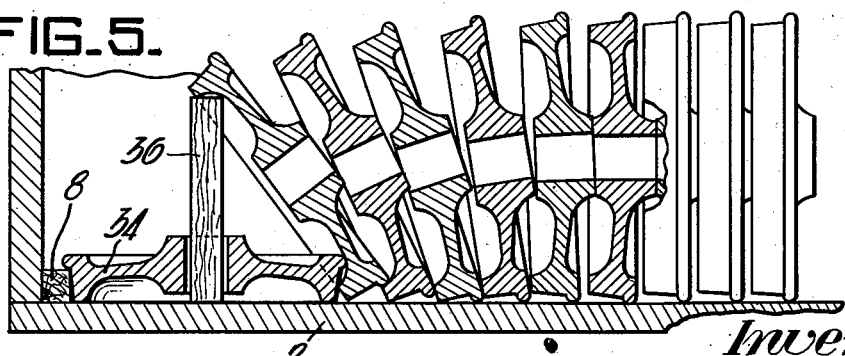
Figure 8:
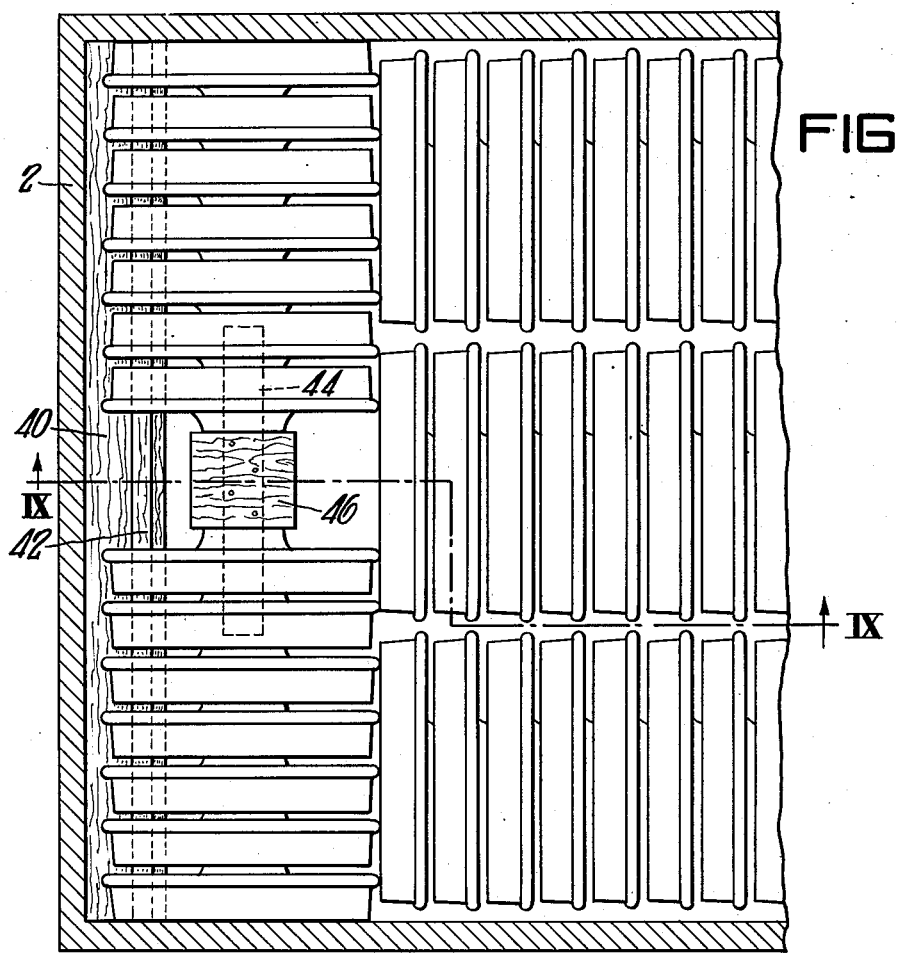
Figure 9:
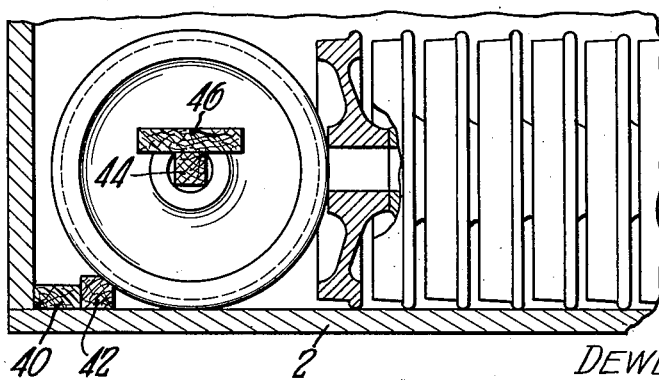

Figure 4 is a plan view showing a modification of the car end wheel piling arrangement;

Figure 5 is a side elevation of Figure 4;

Figure 6 is a plan view showing a modification of Figure 4;

Figure 7 is a side elevation of Figure 6;

Figure 8 is a plan view showing another modification of the car end wheel piling arrangement;

Figure 9 is a sectional view taken on the line IX—IX of Figure 8;

Figure 10 is a plan view showing the center car blocking of a car fully loaded according to the invention; and Figure 11 is a cross-sectional view taken on the line XI—XI of Figure 10.

Referring more particularly to the drawings, the reference numeral 2 indicates a railway box car loaded with railway car wheels according to my invention. Box car 2 is provided with two oppositely located center doorways 4 and 6, doorway 4 being used as a loading doorway. It will be noted that the invention described hereinafter may also be used in a car having only one doorway or any other type of railway car. In loading the car, cross timbers 8 are spiked, bolted or otherwise fastened to the floor of the car adjacent each end wall and a lengthwise timber 10 is positioned across the lower part of the doorway 6 and fastened to the frame thereof. A pair of cleat timbers 12 is fastened to the floor of the car parallel to and spaced slightly from the side walls of the car adjacent doorway 4. A lengthwise timber 14 is set loosely on the floor of the car adjacent the loading doorway 4 between one of the cleats 12 and the side wall of the car so that it can be slid across the doorway and fastened in position after the last wheel is loaded. Timber 14 is of sufficient length so as to span and overlap doorway 4. It is secured in position after loading has been completed by being fastened to the ends of cleat timbers 12.

After the preliminary blocking has been completed, that is, the installation of the cross timbers 8, lengthwise timber 10, cleat timbers 12 and the tentative positioning of lengthwise timber 14, the car wheels are loaded in the car in three parallel rows on each side of the doorways. Each half of the car on either side of the doorways is loaded in the same manner, the rows on one side of the doorways being aligned with the rows on the other side with an open space 16 between the aligned rows. I have found it preferable to load both ends of the car simultaneously so as to maintain an even distribution of weight in the car.

A plurality of the end wheels adjacent space 16 of each of the aligned rows are placed in vertical upright position with their flanges facing toward space 16.

After all the wheels have been loaded in the car, the center blocking of the car is installed. The timber 14 is slid across the loading doorway 4 and fastened to the ends of the cleat timbers 12 to block the doorway. A square needle timber 22 is then threaded into the bores of several of the end wheels of each row adjacent space 16. As the square needle timbers 22 are inserted, an end portion 24 of each is allowed to project outwardly into space 16. The diagonals of the timbers 22 are only slightly smaller than the bores of the wheels. The needle timber holds the wheels together and any tendency for the wheels to fall in either direction will cause them to pinch the needle timber instead of falling.

When the needle timbers have been inserted as described, lengthwise timbers 26 are fastened to the floor of the car in the space 16 between the flanges of the adjacent end wheels of the aligned rows. Lengthwise timbers 28 are lifted between the hubs of the adjacent end wheels and then spiked, bolted or otherwise fastened to the projecting ends 24 of the needle timbers 22. Although I have shown lengthwise timbers 26 blocking the lower portions of the adjacent end wheels of each row, it will be noted that timbers 26 may be omitted, if desired, since timbers 28 will provide satisfactory blocking between the adjacent end wheels. A pair of spaced apart cross timbers 30 is then laid across and fastened to the three lengthwise timbers 28 to prevent the rotation of timbers 28 and needle timbers 22 and also to prevent endwise movement of the needle timbers. Since cross timbers 30 do not function to block the load, it will be obvious that the number thereof is not limited to two but may be one or more, as desired.

The rear wheels of each of the aligned rows adjacent the end walls of the car may be arranged in several ways to be hereinafter described. Figures 1ª and 2ª show one arrangement that may be used.

In this embodiment of my invention the rear wheel 18 of each row is held in vertical upright position with its lower part abutting cross timber 8. As the rows of wheels are loaded in each end of the car, a square needle timber 20 is inserted through the bores of the rear four or five wheels in each row. Needle timber 20 is large enough and fits snugly enough in the bores of the wheels to limit the angle of leaning in the wheels. The weight of the wheels leaning on timber 20 will prevent it from working forward in the row of wheels. The center car blocking is then carried on in the same manner as shown in Figures 1, 2 and 3ª and described hereinbefore.

The loading and blocking is finally completed by positioning a lengthwise timber 32 across each doorway of the car with its ends resting on the flanges of the adjacent end wheels and fastening it to the frame of the doorway. Then, after the loading doorway is closed and sealed, the car is ready to travel.

It should be noted that all the spikes used function to hold the blocking in position and do not carry the load. The timbers are subjected to only compressive, shear and bending stresses. There are none under tensile stress.

Figures 4, 5, 6 and 7 illustrate two modifications of the wheel piling arrangement that may be used with the method of center car blocking described above. In the modification shown in Figures 4 and 5 the rear wheel 34 of each of the three parallel rows at each end of the car is laid flat on the floor of the car with its flange upward and its rim tight against the cross timber 8. A timber 36 is stood upright in the bore of wheel 34. The next wheel in the row is placed in leaning position with the inside surface of the upper portion of its rim resting on the top of the timber 36 and the inside surface of the diametrically opposite portion of its rim resting against the flange of wheel 34. The next succeeding wheels in each of the parallel rows lean one against the other. As the piling of each of the rows progresses, each of the wheels approaches a vertical upright position. The balance of the blocking and loading is the same as shown in Figures 1, 2 and 3 and described hereinbefore.

If desired, the upright timber 36 may be omitted, as shown in Figures 6 and 7, and the wheel adjacent the rear wheel positioned at an angle to the floor of the car with the upper part thereof extending over the rear wheel and its lower part resting on the floor of the car.

The embodiment shown in Figures 8 and 9 is characterized by the crosswise row of wheels adjacent each end of the car and the blocking of the crosswise rows. The remainder of the load and its blocking is exactly the same as that shown in Figures 1, 2 and 3 and described hereinbefore. In loading according to this embodiment, a cross timber 40 is nailed to the floor of the car adjacent each end. A cross chock timber 42 is then spiked to the floor of the car adjacent each cross timber 40. The wheels first loaded are arranged in a crosswise row adjacent each end of the car. If desired, chock timbers 42 may be omitted and only one cross timber used at each end of the car if the cross timbers used are of sufficient width and height to prevent the wheels in the crosswise rows from contacting the end walls of the car. The wheels in each crosswise row are positioned vertically upright with their flanged edges facing the longitudinal median line of the car so that the wheels will lean left and right against the side walls of the car. A square needle timber 44 is threaded into the bores of the wheels on each side of the median line to interlock them. A wedge block 46 is then spiked to needle timber 44 approximately above the median line of the car between the facing wheels to hold timber 44 in position. As stated above, additional wheels may be loaded and blocked in the car in parallel rows in the same manner as shown in Figures 1, 2 and 3.

When it is desired to load a car to its maximum capacity, the open space 16 between the aligned rows of wheels is filled in with additional wheels, as shown in Figures 10 and 11. The blocking in the center of the car is modified as shown and described hereinafter.

A square needle timber 48, which is long enough to span the doorway and overlap the frames, is threaded entirely through the bores of the end wheels of each row toward one end of the car. When all the wheels are loaded in the car, as shown in Figures 10 and 11, the timber 48 is worked far enough through the bores of the end wheels in the opposite row to span the doorway. A wedge block 50 is then spiked to the needle timber to prevent its creeping in either direction. The wedge block 50 also acts as a wedge between the hubs of the opposed wheels. A lengthwise timber 52 is fitted between the flanges of the lower parts of the adjacent end wheels of the aligned rows and then spiked to the floor of the car.

Although I have shown lengthwise timbers 52 blocking the lower portions of the adjacent end wheels of each row, it will be noted that timbers 52 may be omitted if desired since wedge blocks 50 provide satisfactory blocking between the adjacent end wheels.

The loading and blocking is finally completed by positioning a lengthwise timber 54 across each doorway of the car resting on the flanges of the wheels and spiking it to the frame of the doorway. Then, after the loading doorway is closed and sealed, the car is ready to travel.

The piling arrangement of the wheels in a car fully loaded and blocked, as shown in Figures 10 and 11, will be the same as the piling arrangements shown in Figures 1a, 2a, 3a, 4, 5, 6, 7, 8 and 9.

The choice of which of the above described embodiments of the invention to be used in loading is governed by the size of the order to be shipped, the size and weight of the wheels, and the volumetric and weight capacity of the car.

While several embodiments of my invention have been shown and described it will be apparent that other adaptations and modifications may be made without departing from the scope of the following claims.

I claim:

1. The method of preparing a transportation load of center bored wheels or the like for transit in a railway car having a center doorway in at least one side thereof, which method comprises loading the wheels in said car in rows extending to the ends of the car on each side of said doorway lengthwise of the car, the rows on one side of the doorway being aligned with the rows on the other side with an open space between the aligned rows, arranging a plurality of the wheels adjacent the open space in each of the rows in vertical upright position with their axes arranged lengthwise of the car, placing the balance of the wheels in each row between said plurality and the ends of the car abutting each other and abutting also said plurality of wheels to maintain the same in vertical upright position, fastening a timber to the floor of the car lengthwise in said open space between the adjacent end wheels of the aligned rows, threading a needle timber into the bores of a plurality of contiguous wheels adjacent the open space in each row, allowing an end portion of each needle timber to project outwardly from each row into said open space, fitting a timber lengthwise between the faces of the adjacent end wheels of each pair of aligned rows, fastening said last named timbers to the projecting ends of said needle timbers, securing at least one cross timber across the last named lengthwise timbers, and fastening a lengthwise timber across the lower part of said doorway.

2. The method of preparing a transportation load of center bored wheels or the like for transit in a railway car having a center doorway in at least one side thereof, which method comprises loading the wheels in said car in rows extending to the ends of the car on each side of said doorway lengthwise of the car, the rows on one side of the doorway being aligned with the rows on the other side with an open space between the aligned rows, arranging a plurality of the wheels adjacent the open space in each of the rows in vertical upright position with their axes arranged lengthwise of the car, placing the balance of the wheels in each row between said plurality and the ends of the car abutting each other and abutting also said plurality of wheels to maintain the same in vertical upright position, threading a needle timber into the bores of a plurality of contiguous wheels adjacent the open space in each row, allowing an end portion of each needle timber to project outwardly from each row into said open space, fitting a timber lengthwise between the faces of the adjacent end wheels of each pair of the aligned rows, fastening said last named timbers to the projecting ends of said needle timbers, securing one or more cross timbers across the last named lengthwise timbers, and fastening a lengthwise timber across the lower part of said doorway.

3. The method of preparing a transportation load of center bored wheels or the like for transit in a railway car having a center doorway in at least one side thereof, which method comprises fastening a cross timber to the floor of the car adjacent each end thereof, loading the wheels in said car in parallel rows on each side of said doorway lengthwise of the car, the rows on one side of the doorway being aligned with the rows on the other side with an open space between the aligned rows, arranging the wheels in each row in vertical upright position with their axes lengthwise of the car, threading a needle timber through the bores of a plurality of contiguous wheels in the end of each row adjacent the end wall of the car, the bottom edge of the rear wheel in each row being positioned adjacent said cross timber, threading a needle timber into the bores of a plurality of contiguous wheels adjacent the open space in each row, allowing an end portion of each needle timber to project outwardly from each row into said open space, fitting a timber lengthwise between the faces of the adjacent end wheels of each pair of aligned rows, attaching said last named timbers to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

4. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in parallel rows on each side of said doorway lengthwise of the car, the rows on one side of the doorway being aligned with the rows on the other side with an open space between the aligned rows, placing the rear wheel adjacent the cross timber in each row horizontally flat on the floor of the car, positioning the wheel adjacent each of said rear wheels at an angle to the floor of the car with the upper part thereof extending over said horizontal wheel and its lower part resting on the floor of the car, supporting the last named wheel in said position, the remainder of the wheels in each row being arranged progressively approaching vertical upright position with each subsequent wheel leaning against each preceding wheel, arranging a plurality of the wheels adjacent the open space in each of the rows in vertical upright position with their axes lengthwise of the car, threading a needle timber into the bores of a plurality of contiguous wheels adjacent the open space in each row, allowing an end portion of each needle timber to project outwardly from each row into said open space, fitting a timber lengthwise between the faces of the adjacent end wheels of each pair of aligned rows, attaching said last named timbers to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

5. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in parallel rows on each side of said doorway lengthwise of the car, the rows on one side of the doorway being aligned with the rows on the other side with an open space between the aligned rows, placing the rear wheel adjacent the cross timber in each row horizontally flat on the floor of the car, inserting an upright timber into the bore of each of said rear wheels, positioning the wheel next adjacent each of said rear wheels at an angle from the floor of the car with the upper inside portion of its rim resting on the top of said upright timber and the bottom inside portion of its rim resting against the rim of said horizontally positioned rear wheel, the remainder of the wheels in each row being arranged progressively approaching vertical upright position with each subsequent wheel leaning against each preceding wheel, arranging a plurality of the wheels adjacent the open space in each of the rows in vertical upright position with their axes lengthwise of the car, threading a needle timber into the bores of a plurality of contiguous wheels adjacent the open space in each row, allowing an end portion of each needle timber to project outwardly from each row into said open space, fitting a timber lengthwise between the faces of the adjacent end wheels of each pair of aligned rows, attaching said last named timbers to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

6. The method of preparing a transportation load of center bored wheels or the like for transit in a railway car having a center doorway in at least one side thereof, which method comprises fastening a cross timber to the floor of the car adjacent each end thereof, loading a row of wheels crosswise at each end of the car, positioning the wheels in said crosswise rows vertically upright position adjacent said cross timber, threading a needle timber through the bores of the wheels in each crosswise row, fastening a wedge block to said needle timber to hold the needle timber in position and prevent transverse movement of the wheels, loading additional wheels in the car in vertical upright position in parallel rows on each side of said doorway lengthwise of the car, the rows on one side of the doorway being aligned with the rows on the other side with an open space between the aligned rows, the rear wheel of each lengthwise row abutting one of the crosswise rows of wheels, threading a needle timber into the bores of a plurality of contiguous wheels adjacent the open space in each lengthwise row, allowing an end portion of each needle timber to project outwardly from each row into said open space, fitting a timber lengthwise between the faces of the adjacent end wheels of each pair of aligned rows, attaching said last named timber to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, and fastening a lengthwise timber to said cleat timbers to span and block said doorway.

7. The method of preparing a transportation load of center bored wheels or the like for transit in a closed railway car having a center doorway in at least one side thereof, which method comprises loading the wheels in said car in rows on each side of said doorway lengthwise of the car, the rows on one side of the doorway being aligned with the rows on the other side with an open space between the aligned rows, arranging a plurality of the wheels adjacent the open space in each of the rows in vertical upright position with their axes arranged lengthwise of the car, placing the balance of the wheels in each row between said plurality and the ends of the car abutting each other and abutting also said plurality of wheels to maintain the same in vertical upright position, fastening a timber to the floor of the car lengthwise in said open space between the adjacent end wheels of each pair of aligned rows, threading a needle timber into the bores of a plurality of the end wheels adjacent the open space in each pair of aligned side rows, fitting a wedge block between the faces of the adjacent end wheels of each pair of aligned rows, fastening said wedge block to said needle timber, and fastening a timber across the lower part of said doorway.

8. The method of preparing a transportation load of center bored wheels or the like for transit in a closed railway car having a center doorway in at least one side thereof, which method comprises loading the wheels in said car in rows on each side of said doorway lengthwise of the car, the rows on one side of the doorway being aligned with the rows on the other side with an open space between the aligned rows, arranging a plurality of the wheels in each of the rows adjacent the open space in vertical upright position with their axes lengthwise of the car, placing the balance of the wheels in each row between said plurality and the ends of the car abutting each other and abutting also said plurality of wheels to maintain the same in vertical upright position, threading a needle timber into the bores of a plurality of the end wheels adjacent the open space in each pair of aligned side rows, fitting a wedge block between the faces of the adjacent end wheels of each pair of aligned rows, fastening said wedge block to said needle timber, and fastening a timber across the lower part of said doorway.

9. The method of preparing a transportation load of center bored wheels or the like for transit in a railway car having a center doorway in at least one side thereof, which method comprises fastening a cross timber to the floor of the car adjacent each end thereof, loading the wheels in said car in parallel rows on each side of said doorway lengthwise of the car, the rows on one side of the doorway being aligned with the rows on the other side with an open space between the aligned rows, placing the wheels in each row in vertical upright position with their axes arranged lengthwise of the car, threading a needle timber through the bores of a plurality of contiguous wheels in the end of each row adjacent the end wall of the car, the bottom edge of the rear wheel in each row being positioned adjacent said cross timber, threading a needle timber into the bores of a plurality of the end wheels adjacent the open space in each pair of aligned lengthwise rows, fitting a wedge block between the faces of the adjacent end wheels of each pair of aligned rows, attaching said wedge block to said needle timber in each row, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

10. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in parallel rows on each side of said doorway lengthwise of the car, the rows on one side of the doorway being aligned with the rows on the other side with an open space between the aligned rows, placing the rear wheel adjacent the cross timber in each row horizontally flat on the floor of the car, positioning the wheel adjacent each of said rear wheels at an angle to the floor of the car with the upper part thereof extending over said horizontal wheel and its lower part resting on the floor of the car, supporting the last named wheel in said position, the remainder of the wheels in each row being arranged progressively approaching vertical upright position with each subsequent wheel leaning against each preceding wheel, arranging a plurality of the wheels adjacent the open space in each of the rows in vertical upright position with their axes lengthwise of the car, threading a needle timber into the bores of a plurality of the end wheels adjacent the open space in each pair of aligned rows, fitting a wedge block between the faces of the adjacent end wheels of the aligned rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

11. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in parallel rows on each side of said doorway lengthwise of the car, the rows on one side of the doorway being aligned with the rows on the other side with an open space between the aligned rows, placing the rear wheel adjacent the cross timber in each row horizontally flat on the floor of the car, inserting an upright timber into the bore of each of said rear wheels, positioning the wheel next adjacent each of said rear wheels at an angle from the floor of the car with the upper inside portion of its rim resting on the top of said upright timber and the bottom inside portion of its rim resting against the rim of said horizontally positioned rear wheel, the remainder of the wheels in each row being arranged progressively approaching vertical upright position with each subsequent wheel leaning against each preceding wheel, arranging a plurality of the wheels adjacent the open space in each of the rows in vertical upright position with their axes lengthwise of the car, threading a needle timber into the bores of a plurality of the end wheels adjacent the open space in each pair of aligned rows, fitting a wedge block between the faces of the adjacent end wheels of each pair of aligned rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

12. The method of preparing a transportation load of center bored wheels or the like for transit in a railway car having a center doorway in at least one side thereof, which method comprises fastening a cross timber to the floor of the car adjacent each end thereof, loading a row of wheels crosswise at each end of the car, positioning the wheels in said crosswise rows vertically upright adjacent said cross timber, threading a needle timber through the bores of the wheels in each crosswise row, fastening a wedge block to said needle timber to hold the needle timber in position and prevent transverse movement of the wheels, loading additional wheels in the car in vertical upright position in parallel rows on each side of said doorway lengthwise of the car, the rows on one side of the doorway being aligned with the rows on the other side with an open space between the aligned rows, the rear wheel of each lengthwise row abutting one of the crosswise rows of wheels, threading a needle timber into the bores of a plurality of end wheels adjacent the open space in each pair of aligned lengthwise rows, fitting a wedge block between the faces of the adjacent end wheels of the aligned rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

13. A transportation load of center bored wheels or the like for a railway car having a center doorway in at least one side thereof, which load comprises a plurality of car wheels arranged in said car in rows extending to the ends of the car on each side of said doorway lengthwise of the car, the rows on one side of the doorway being aligned with the rows on the other side with an open space between the aligned rows, a plurality of the wheels adjacent the open space in each of the rows being in vertical upright position with the axes thereof arranged lengthwise of the car, the balance of the wheels in each row between said plurality and the ends of the car abutting each other and abutting also said plurality of wheels to maintain the same in vertical upright position, a timber fastened to the floor of the car lengthwise between the adjacent end wheels of the aligned rows, a needle timber threaded into the bores of a plurality of contiguous wheels adjacent the open space in each row, a portion of each needle timber projecting outwardly from each row into said space, a timber fitted lengthwise in each row between the faces of the wheels adjacent said space, said last named timber being fastened to the projecting ends of said needle timbers, at least one cross timber fastened across the last named lengthwise timbers, and a lengthwise timber fastened across the lower part of the doorway of said car.

14. A transportation load of center bored wheels or the like for a railway car having a center doorway in at least one side thereof, which load comprises a plurality of car wheels arranged in said car in rows extending to the ends of the car on each side of said doorway lengthwise of the car, the rows on one side of the doorway being aligned with the rows on the other side with an open space between the aligned rows, a plurality of the wheels adjacent the open space in each of the rows being in vertical upright position with the axes thereof arranged lengthwise of the car, the balance of the wheels in each row between said plurality and the ends of the car abutting each other and abutting also said plurality of wheels to maintain the same in vertical upright position, a needle timber threaded into the bores of a plurality of contiguous wheels adjacent the open space in each row, a portion of each needle timber projecting outwardly from each row into said space, a timber fitted lengthwise in each row between the faces of the wheels adjacent said space, said last named timber being fastened to the projecting ends of said needle timbers, at least one cross timber fastened across the last named lengthwise timbers, and a lengthwise timber fastened across the lower part of the doorway of said car.

15. A transportation load of center bored wheels or the like for a railway car having a center doorway in at least one side thereof, which load comprises a cross timber fastened to the floor of the car adjacent each end thereof, a plurality of wheels arranged in said car in parallel rows on each side of said doorway lengthwise of the car, the rows on one side of the doorway being aligned with the rows on the other side with an open space between the aligned rows, the wheels in each row being in vertical upright position with their axes arranged lengthwise of the car, a needle timber threaded through the bores of a plurality of contiguous wheels in the end of each row adjacent the end wall of the car, the bottom edge of each end wheel being adjacent said cross timber, a needle timber threaded into the bores of a plurality of contiguous wheels adjacent the open space in each row, a portion of each needle timber projecting outwardly from each row into said open space, a timber fitted lengthwise in each row between the faces of the wheels adjacent said space, said last named timber being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

16. A transportation load of center bored and rimmed wheels or the like for a railway car having a center doorway in at least one side thereof, which load comprises a cross timber fastened to the floor of the car adjacent each end thereof, a plurality of car wheels arranged in said car in parallel rows on each side of said doorway lengthwise of the car, the rows on one side of the doorway being aligned with the rows on the other side with an open space between the aligned rows, the rear wheel adjacent the cross timber in each row being positioned horizontally flat on the floor of the car, the wheel next adjacent each of said rear wheels being positioned at an angle to the floor of the car with the upper part thereof extending over said horizontal wheel and its lower part resting on the floor of the car, the next succeeding wheels in each row being placed progressively approaching vertical upright position with each subsequent wheel leaning against each preceding wheel, a plurality of wheels in each of the rows adjacent the open space being in vertical upright position with the axes thereof arranged lengthwise of the car, a needle timber threaded into the bores of a plurality of contiguous wheels adjacent the open space in each row, an end portion of each needle timber projecting outwardly from each row into said space, a timber fitted lengthwise in each row between the faces of the wheels adjacent said space, said last named timbers being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

17. A transportation load of center bored and rimmed wheels or the like for a railway car having a center doorway in at least one side thereof, which load comprises a cross timber fastened to the floor of the car adjacent each end thereof, a plurality of car wheels arranged in said car in parallel rows on each side of said doorway lengthwise of the car, the rows on one side of the doorway being aligned with the rows on the other side with an open space between the aligned rows, the rear wheel adjacent the cross timber in each row being positioned horizontally flat on the floor of the car, an upright timber inserted into the bore of each of said rear wheels and projecting upwardly therefrom, the wheel next adjacent each of said rear wheels being positioned at an angle from the floor of the car with the upper inside portion of its rim resting on the top of said upright timber, and the bottom inside portion of its rim resting against the rim of said horizontally positioned rear wheel, the next succeeding wheels in each row being placed progressively approaching vertical upright position with each subsequent wheel leaning against each preceding wheel, a plurality of the wheels adjacent the open space in each of the rows being in vertical upright position with the axes thereof arranged lengthwise of the car, a needle timber threaded into the bores of a plurality of contiguous wheels adjacent the open space in each row, an end portion of each needle timber projecting outwardly from each row into said space, a timber fitted lengthwise in each row between the faces of the wheels adjacent said space, said last named timbers being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

18. A transportation load of center bored wheels or the like for a railway car having a center doorway in at least one side thereof, which load comprises a cross timber fastened to the floor of the car adjacent each end thereof, a plurality of wheels arranged in a crosswise row at each end of the car, the wheels in said crosswise rows being positioned vertically upright adjacent said cross timber, a needle timber threaded into the bores of the wheels in each crosswise row, a wedge block fastened to said needle timber to hold the needle timber in position and prevent transverse movement of the wheels, additional wheels arranged in the car in vertical upright position in parallel rows on each side of said doorway lengthwise of the car, the rows on one side of the doorway being aligned with the rows on the other side with an open space between the aligned rows, the rear wheel of each lengthwise row abutting one of the crosswise rows of wheels, a needle timber threaded into the bores of a plurality of contiguous wheels adjacent the open space in each lengthwise row, an end portion of each needle timber projecting outwardly from each row into said open space, a timber fitted lengthwise in each row between the faces of the wheels adjacent said space, said last named timber being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

19. A transportation load of center bored wheels for a railway car having a center doorway in at least one side thereof, which load comprises a plurality of car wheels arranged in said car in rows on each side of said doorway lengthwise of the car, the rows on one side of the doorway being aligned with the rows on the other side with an open space between the aligned rows, a plurality of the wheels adjacent the open space in each of the rows being in vertical upright position with the axes thereof arranged lengthwise of the car, the balance of the wheels in each row between said plurality and the ends of the car abutting each other and abutting also said plurality of wheels to maintain the same in vertical upright position, a timber fastened to the floor of the car lengthwise in said open space between the end wheels of each pair of aligned rows, a needle timber threaded into the bores of a plurality of the end wheels adjacent the open space in each pair of aligned rows, a wedge block attached to each of said needle timbers to prevent endwise movement thereof, and a lengthwise timber fastened across the lower part of the doorway of said car.

20. A transportation load of center bored wheels for a railway car having a center doorway in at least one side thereof, which load comprises a plurality of car wheels arranged in said car in parallel rows on each side of said doorway lengthwise of the car, the rows on one side of the doorway being aligned with the rows on the other side with an open space between the aligned rows, a plurality of the wheels in each of the rows adjacent the open space being in vertical upright position with the axes thereof arranged lengthwise of the car, the balance of the wheels in each row between said plurality and the ends of the car abutting each other and abutting also said plurality of wheels to maintain the same in vertical upright position, a needle timber threaded into the bores of a plurality of the end wheels adjacent the open space in each pair of aligned rows, a wedge block attached to each of said needle timbers to prevent endwise movement thereof, and a lengthwise timber fastened across the lower part of the doorway of said car.

21. A transportation load of center bored wheels for a railway car having a center doorway in at least one side thereof, which load comprises a cross timber fastened to the floor of the car adjacent each end thereof, a plurality of car wheels arranged in said car in parallel rows on each side of said doorway lengthwise of the car, the rows on one side of the doorway being aligned with the rows on the other side with an open space between the aligned rows, the wheels in each row being in vertical upright position with their axes arranged lengthwise of the car, a needle timber threaded through the bores of a plurality of contiguous wheels in the end of each row adjacent the end wall of the car, the bottom edge of each end wheel being adjacent said cross timbers, a needle timber threaded into the bores of a plurality of the end wheels adjacent the open space in each pair of aligned rows, a wedge block fitted between the faces of the adjacent end wheels of each pair of aligned rows, said wedge blocks being fastened to the needle timber in each row, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

22. A transportation load of center bored and rimmed wheels or the like for a railway car having a center doorway in at least one side thereof, which load comprises a cross timber fastened to the floor of the car adjacent each end thereof, a plurality of car wheels arranged in said car in parallel rows on each side of said doorway lengthwise of the car, the rows on one side of the doorway being aligned with the rows on the other side with an open space between the aligned rows, the rear wheel adjacent the cross timber in each row being positioned horizontally flat on the floor of the car, the wheel next adjacent each of said rear wheels being positioned at an angle to the floor of the car with the upper part thereof extending over said horizontal wheel and its lower part resting on the floor of the car, the next succeeding wheels in each row being placed progressively approaching vertical upright position with each subsequent wheel leaning against each preceding wheel, a plurality of the wheels in each of the rows adjacent the open space being in vertical upright position with the axes thereof arranged lengthwise of the car, a needle timber threaded into the bores of a plurality of the end wheels adjacent the open space in each pair of aligned rows, a wedge block attached to each of said needle timbers to prevent endwise movement thereof, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

23. A transportation load of center bored and rimmed wheels or the like for a railway car having a center doorway in at least one side thereof, which load comprises a cross timber fastened to the floor of the car adjacent each end thereof, a plurality of car wheels arranged in said car in parallel rows on each side of said doorway lengthwise of the car, the rows on one side of the doorway being aligned with the rows on the other side with an open space between the aligned rows, the rear wheel adjacent the cross timber in each row being positioned horizontally flat on the floor of the car, an upright timber inserted into the bore of each of said rear wheels and projecting upwardly therefrom, the wheel next adjacent each of said rear wheels being positioned at an angle from the floor of the car with the upper inside portion of its rim resting on the top of said upright timber, and the bottom inside portion of its rim resting against the rim of said horizontally positioned rear wheel, the next succeeding wheels in each row being placed progressively approaching vertical upright position with each subsequent wheel leaning against each preceding wheel, a plurality of the wheels in each of the rows adjacent the open space being in vertical upright position with the axes thereof arranged lengthwise of the car, a needle timber threaded into the bores of a plurality of the end wheels adjacent the open space in each pair of aligned rows, a wedge block attached to each of said needle timbers to prevent endwise movement thereof, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

24. A transportation load of center bored wheels for a railway car having a center doorway in at least one side thereof, which load comprises a cross timber fastened to the floor of the car adjacent each end thereof, a plurality of wheels arranged in a crosswise row at each end of the car, the wheels in said crosswise rows being positioned vertically upright adjacent said cross timber, a needle timber threaded into the bores of the wheels in each crosswise row, a wedge block fastened to said needle timber to hold the needle timber in position and prevent transverse movement of the wheels, additional wheels arranged in the car in vertical upright position in parallel rows on each side of said doorway lengthwise of the car, the rows on one side of the doorway being aligned with the rows on the other side with an open space between the aligned rows, the rear wheel of each lengthwise row abutting one of the crosswise rows of wheels, a needle timber threaded into the bores of a plurality of the end wheels adjacent the open space in each pair of aligned lengthwise rows, a wedge block fitted between the faces of the adjacent end wheels of each pair of aligned rows, said wedge block being fastened to the needle timber in each row, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

25. The method of preparing a transportation load of center bored wheels or the like for transit in a railway car having a center doorway in at least one side thereof, which method comprises loading the wheels in said car in aligned rows extending to the ends of the car on each side of said doorway lengthwise of the car with a center space between the aligned rows, placing a plurality of the end wheels adjacent said center space of each of the rows in vertical upright position with their bores in alignment, placing the balance of the wheels in each row between said plurality and the ends of the car abutting each other and abutting also said plurality of wheels to maintain the same in vertical upright position, fastening a lengthwise timber to the floor of the car in said center space between each of the aligned rows with the ends thereof abutting the opposed end wheels of the aligned rows, threading a needle timber into the bores of a plurality of the end wheels adjacent said center space in each of the aligned rows, and locking said needle timber against endwise movement in said bores.

26. A transportation load of center bored wheels for a railway car having a center doorway in at least one side thereof, which load comprises a plurality of wheels arranged in said car in aligned rows extending to the ends of the car on each side of said doorway lengthwise of the car with a center space between the aligned rows, a plurality of the end wheels adjacent said center space of each of the rows being placed in vertical upright position with their bores in alignment, the balance of the wheels in each row between said plurality and the ends of the car abutting each other and abutting also said plurality of wheels to maintain the same in vertical upright position, a lengthwise timber fastened to the floor of the car in said center space between each of the aligned rows with the ends thereof abutting the opposed end wheels of the aligned rows, a needle timber threaded into the bores of a plurality of the end wheels adjacent said center space in each of the aligned rows, and means for locking said needle timber against endwise movement.

DEWEY M. SEELEY.

No references cited.